(12) United States Patent
Fraser et al.

(10) Patent No.: US 9,561,455 B2
(45) Date of Patent: Feb. 7, 2017

(54) FLUID FILTER DEVICE

(75) Inventors: Jim Fraser, St. Thomas (CA); Ronald P. Cook, London (CA); Glen E. Latimer, Jr., Chagrin Falls, OH (US)

(73) Assignee: TROJAN TECHNOLOGIES, London (CA)

( * ) Notice: Subject to any disclaimer, the term of this patent is extended or adjusted under 35 U.S.C. 154(b) by 480 days.

(21) Appl. No.: 13/817,915

(22) PCT Filed: Aug. 19, 2011

(86) PCT No.: PCT/CA2011/000928
§ 371 (c)(1),
(2), (4) Date: May 1, 2013

(87) PCT Pub. No.: WO2012/021971
PCT Pub. Date: Feb. 23, 2012

(65) Prior Publication Data
US 2013/0206674 A1    Aug. 15, 2013

Related U.S. Application Data

(60) Provisional application No. 61/375,448, filed on Aug. 20, 2010.

(51) Int. Cl.
*B01D 29/66* (2006.01)
*B01D 29/11* (2006.01)
(Continued)

(52) U.S. Cl.
CPC .............. *B01D 29/66* (2013.01); *B01D 29/114* (2013.01); *B01D 29/117* (2013.01); *B01D 29/52* (2013.01);
(Continued)

(58) Field of Classification Search
None
See application file for complete search history.

(56) References Cited

U.S. PATENT DOCUMENTS 1,340,599 A * 5/1920 Clarke .......................... 210/311
4,552,655 A * 11/1985 Granot .......................... 210/108
(Continued)

FOREIGN PATENT DOCUMENTS

CN        201353455 Y     12/2009
CN       2013353455 Y     12/2009
(Continued)

OTHER PUBLICATIONS

International Search Report for international Application No. PCT/CA2011/000928 with a mailing date of Dec. 21, 2011.
(Continued)

*Primary Examiner* — Benjamin Kurtz
(74) *Attorney, Agent, or Firm* — Katten Muchin; Rosenman LLP

(57) ABSTRACT

There is disclosed a fluid filter device. The fluid filter device comprises: a primary filter section having a first porous section; and a secondary filter section having second porous section; wherein: (i) the primary filter section and the secondary filter section are in fluid communication with one another, and (ii) the first porous section has a greater porosity than the second porous section. There is also disclosed a fluid isolation device for isolation an exterior fluid from a surface of an enclosure containing interior fluid. The device comprises a sleeve element movable between: (i) a retracted portion in which exterior fluid contacts the surface of the enclosure, and (ii) an extended position in which exterior fluid is isolated from contacting the surface of the enclosure. A distal portion of the sleeve element is configured to actuate a backwash element configured to backwash the interior fluid from the enclosure when the sleeve element is in the extended position.

38 Claims, 14 Drawing Sheets

(51) Int. Cl.
  *B01D 29/52* (2006.01)
  *B01D 29/54* (2006.01)
  *B01D 29/56* (2006.01)
  *B01D 29/58* (2006.01)
  *B01D 29/68* (2006.01)

(52) U.S. Cl.
  CPC ............ *B01D 29/58* (2013.01); *B01D 29/668* (2013.01); *B01D 29/68* (2013.01)

(56) References Cited

U.S. PATENT DOCUMENTS

| | | | |
|---|---|---|---|
| 5,443,726 | A | 8/1995 | Steiner et al. |
| 5,526,740 | A | 6/1996 | Lee |
| 5,527,462 | A | 6/1996 | Davis et al. |
| 5,569,383 | A | 10/1996 | Vander Ark, Jr. et al. |
| 5,595,655 | A | 1/1997 | Steiner |
| 5,871,652 | A | 2/1999 | England et al. |
| 6,447,680 | B1 | 9/2002 | Richard |
| 6,932,900 | B2 | 8/2005 | Sann et al. |
| 2004/0055946 | A1 | 3/2004 | Schmidt |
| 2006/0043014 | A1* | 3/2006 | Takatsuka .................... 210/411 |
| 2008/0149574 | A1 | 6/2008 | Read |
| 2010/0206820 | A1 | 8/2010 | Welch, Jr. et al. |

FOREIGN PATENT DOCUMENTS

| | | |
|---|---|---|
| CN | 101785941 A | 7/2010 |
| EP | 0 722 760 A1 | 7/1996 |
| EP | 1 785 178 A1 | 5/2007 |
| JP | 60-67119 U | 5/1985 |
| JP | 04-122608 U | 11/1992 |
| JP | 2000-117013 A | 4/2000 |
| JP | 2002-011309 A | 1/2002 |
| JP | 2003-520120 A | 7/2003 |
| JP | 2004-141748 A | 5/2004 |
| JP | 2004-141785 A | 5/2004 |
| JP | 2006-239530 A | 9/2006 |
| JP | 2010-119999 A | 6/2010 |

OTHER PUBLICATIONS

Office Action for Canadian Patent Application No. 2,801,216 with a mailing date of Apr. 30, 2013.
Office Action for Canadian Patent Application No. 2,801,216 with a mailing date of Feb. 11, 2014.
Office Action for Canadian Patent Application No. 2,808,232 with a mailing date of Oct. 2, 2014.
Office Action for Canadian Patent Application No. 2,808,323 with a mailing date of May 13, 2015.
The First Office Action for Chinese Patent Application No. 201180050654.X with a mailing date of Jun. 10, 2014.
The Second Office Action for Chinese Patent Application No. 201180050654.X with a mailing date of Feb. 17, 2015.
Extended European Search Report for European Patent Application No. 11 81 7604 with a mailing date of Dec. 19, 2013.
The Third Office Action for Chinese Patent Application No. 201180050654.X with a mailing date of Sep. 24, 2015.
First Office Action for Japanese Patent Application No. 2013-525091 with a mailing date of Jul. 14, 2015.
Japanese Office Action for JP Appln. No. 2013-525091 and its English translation.

* cited by examiner

FLUID FILTER DEVICE

CROSS-REFERENCE TO RELATED APPLICATION

The present application claims the benefit under 35 U.S.C. §119(e) of provisional patent application Ser. No. 61/375,448, filed Aug. 20, 2010, the contents of which are hereby incorporated by reference.

BACKGROUND OF THE INVENTION

Field of the Invention

In one of its aspects, the present invention relates to a fluid filter device. In another of its aspects, the present invention relates to a fluid isolation device.

Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;

difficult accessibility to submerged reactor and/or wetted equipment (lamps, sleeve cleaners, etc);

difficulties associated with removal of fouling materials from fluid treatment equipment;

relatively low fluid disinfection efficiency, and/or full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a crosspiece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re 36,896 (all in the name of Maarschalkerweerd and all assigned to the assignee of the present invention and hereinafter referred to as the Maarschalkerweerd #2 patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

The Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Historically, the fluid treatment modules and systems described in the Maarschalkerweerd #1 and #2 patents have found widespread application in the field of municipal waste water treatment (i.e., treatment of water that is discharged to a river, pond, lake or other such receiving stream).

In the field of municipal drinking water, it is known to utilize so-called "closed" fluid treatment systems or "pressurized" fluid treatment systems.

Closed fluid treatment devices are known—see, for example, U.S. Pat. No. 5,504,335 (Maarschalkerweerd #3). Maarschalkerweerd #3 teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid.

U.S. Pat. No. 6,500,346 [Taghipour et al. (Taghipour)] also teaches a closed fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

The various embodiments described in the Maarschalkerweerd #1 patents, the Maarschalkerweerd #2 patents, the Maarschalkerweerd #3 patents and Taghipour relate to land-based fluid radiation treatment systems. Typically, the fluid radiation treatment systems are used in conjunction with other treatment systems in the municipal wastewater treatment plant or the municipal drinking water treatment plant, as the case may be. In such installations, various conduit systems and the like are used to interconnect the fluid radiation treatment system to the other fluid treatment systems in the installation.

It is conventional in such installations to compartmentalize each treatment system in the installation such that each treatment system is configured to create its own optimized flow fluid. This approach has been satisfactory for land-based fluid treatment systems.

A problem arises in applications of fluid treatment systems where a very small footprint is available for overall fluid treatment. This problem arises particularly when it is desired to treat ballast water in shipping vessels.

The continuous introduction and spread of aquatic non-indigenous species is a serious threat to the marine environment. Unlike other forms of pollution, once a non-indigenous species establishes itself, it will remain in its new location. While calculating the potential side effects on human food supply, economy, health and overall biodiversity is difficult, there is widespread acceptance that the cost could be staggering.

One primary culprit for introduction and spread of aquatic non-indigenous species is due to unabated transference of ballast water from shipping vessels. Ballast water taken on in one body of water or ecological zone and released into another body of water or ecological zone can introduce so-called Aquatic Invasive Species (AIS) that has the potential to cause detrimental impact on one or more of the biodiversity, economy and human health of the receiving community.

Typically, a shipping vessel will take on ballast water (fresh water and/or salt water) and at a source point and hold this in onboard ballast tanks and/or cargo holds to increase stability and maneuverability during transit. Once the shipping vessel arrives at its destination point, the ballast water is typically discharged from the onboard ballast tanks and/or cargo holds. Also, it is common for ballast water to be taken on and/or discharged during transit between the source point and the destination point. It has been estimated that 3-5 billion tonnes of ballast water is transferred in this manner on an annual basis.

Co-pending U.S. patent application Ser. No. 12/777,691 [Fraser] teaches a fluid treatment system particularly well suited for treatment of ballast water on a shipping vessel. More particularly, the fluid treatment system comprises: (i) a fluid inlet; (ii) a fluid outlet; and (iii) a fluid treatment zone in fluid communication with the fluid inlet and the fluid outlet. The fluid treatment zone comprises a housing within which is disposed a fluid separation section (the separation section may include a single separation device or a combination of two or more similar or dissimilar separation devices) and a fluid radiation section in fluid communication with one another. The fluid separation section removes solids in the fluid and the fluid radiation section irradiates the fluid to deactive microorganisms in the fluid. The fluid separation section and the fluid radiation section are configured to have a substantially common fluid flow path which significantly reduces the space or footprint requirement of and/or significantly reduces hydraulic head loss (pressure drops) in the overall fluid treatment system while allowing the two sections to perform their respective functions.

While the fluid treatment system taught by Fraser is an advance in the art, there is room for improvement.

Specifically, while the fluid treatment system taught by Fraser describes a so-called fluid separation section for removal of solids in the fluid, there are areas of potential improvement. For example, it is known ballast water can contain bacteria, zooplankton, phytoplankton and the like. As is known, ultraviolet radiation can be used to treat bacteria, filtration can be used to treat (remove) zooplankton and either ultraviolet radiation or filtration can be used to treat phytoplankton.

When the fluid treatment system taught by Fraser is installed in a shipping vessel, it is important to optimize ship resources such as pump head, available space and electrical power. On the one hand, if the fluid separation section utilizes a filter that is too coarse, too much particular material will be passed through the filter thereby necessitating the use higher amounts of ultraviolet radiation—i.e., this causes an increase in the amount of electrical power necessary to treat the ballast water. On the other hand if the fluid separation section utilizes a filter that is too fine, valuable pump head is lost during ballast water treatment and/or exchange.

Accordingly, there is a need for a filter device that can be implemented in the fluid treatment system taught by Fraser which achieves an acceptable balance between treatment of microorganisms by the fluid radiation section and reducing the amount of power consumption required to operate the fluid radiation section.

SUMMARY OF THE INVENTION

It is an object of the present invention to obviate or mitigate at least one of the above-mentioned disadvantages of the prior art.

It is another object of the present invention to provide a fluid filter device.

It is another object of the present invention to provide a fluid isolation device.

Accordingly, in one of its aspects, the present invention provides a fluid filter device comprising:
a primary filter section having a first porous section; and
a secondary filter section having second porous section;
wherein: (i) the primary filter section and the secondary filter section are in fluid communication with one another, and (ii) the first porous section has a greater porosity than the second porous section.

In another of its aspects, the present invention provides a fluid isolation device for isolation an exterior fluid from a surface of an enclosure containing interior fluid, the device comprising a sleeve element movable between: (i) a retracted portion in which exterior fluid contacts the surface of the enclosure, and (ii) an extended position in which exterior fluid is isolated from contacting the surface of the enclosure; a distal portion of the sleeve element configured to actuate a backwash element configured to backwash interior fluid from the enclosure when the sleeve element is in the extended position.

Thus, the present inventors have discovered a novel fluid filter device which is particularly well suited for use with the fluid treatment system described in co-pending U.S. patent application Ser. No. 12/777,691 [Fraser] described above. Of course, the present fluid filter device can be used in a number of other applications.

The following advantages accrue from the present fluid filter device:
- the advantages of a so-called fine filter while mitigating or obviating the disadvantages of such a filter due to quick clogging that normally occurs—this is achieved by separating a significant portion of coarser fouling materials from the flow stream via an upstream relatively coarse filter section;
- the ability to optimize filter size;
- the ability to couple a cleaning device (optional) to the fluid filter device to maximize system's effectiveness for both stages of filtration;
- the present fluid filter device is relatively compact and, in a preferred embodiment, the first porous section and the second porous section are disposed inside a single pressurized vessel; and
- the ability to implement the present fluid filter device using a so-called modular approach wherein a number of fluid filter devices may be disposed in a closed pressurized system Of course, other advantages will be apparent to those of skill in the art having in hand the present specification.

Optionally, the present fluid filter device further comprises a cleaning device (a preferred embodiment of the fluid isolation device referred to above) configured to remove fouling materials from one or both of the first porous section and the second porous section. Preferred embodiments of the cleaning device referred to hereinbelow form a separate, independent aspect of the present invention—i.e., separate from the fluid filter device and the fluid backwash system. In this context all preferred features of the cleaning device are incorporated in this separate, independent aspect of the present invention.

Optionally, the present fluid filter device further comprises a fluid backwash system which allows for backwashing of the fluid filter device on a periodic basis. The fluid backwash system referred to hereinbelow forms a separate, independent aspect of the present invention—i.e., separate from the fluid filter device and the cleaning device. In this context all preferred features of the fluid backwash valve element are incorporated in this separate, independent aspect of the present invention.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
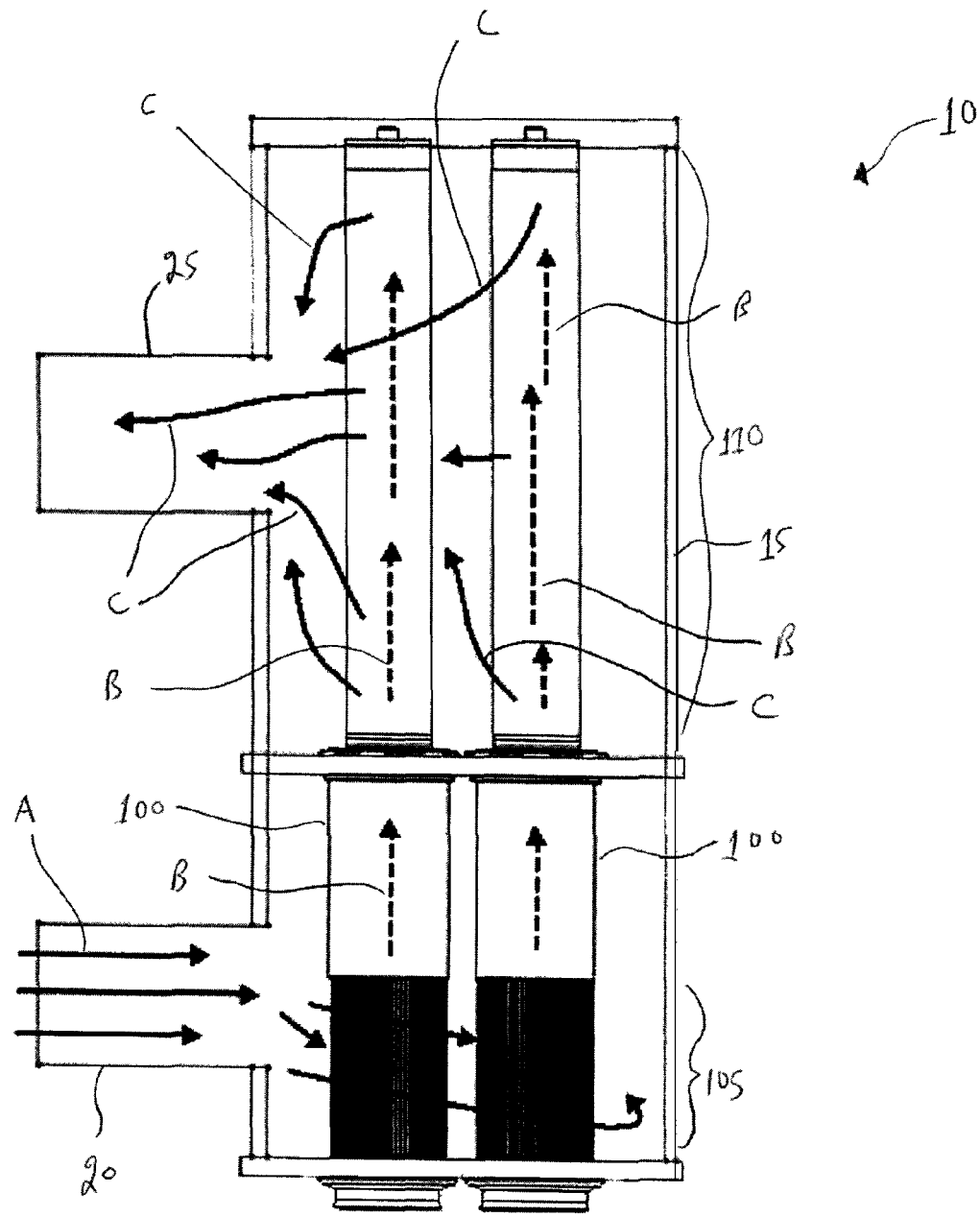
FIG. 1 illustrates a sectional schematic view of implementation of a preferred embodiment of the present fluid filter device.

In one of its aspects, the present invention relates to a fluid filter device comprising: a primary filter section having a first porous section; a secondary filter section having second porous section; wherein: (i) the primary filter section and the secondary filter section are in fluid communication with one another, and (ii) the first porous section has a greater porosity than the second porous section. Preferred embodiments of this embodiment of the present invention may include any one or a combination of any two or more any of the following features:
- the primary filter section is comprised in a first elongate housing;
- the secondary filter section is comprised in a second elongate housing;
- the primary filter section is comprised in a first elongate housing and the secondary filter section is comprised in a second elongate housing;

the first housing and the second housing are in fluid communication with one another;

the first housing and the second housing are unitary;

the primary filter section is configured to allow fluid to travel from an exterior thereof to an interior thereof;

the secondary filter section is configured to allow fluid to travel from an interior thereof to an exterior thereof;

the primary filter section is configured to allow fluid to travel from an exterior thereof to an interior thereof, and the secondary filter section is configured to allow fluid to travel from an interior thereof to an exterior thereof;

the primary filter section is configured to allow fluid to travel from an exterior of the first elongate housing to an interior of the first elongate housing;

the secondary filter section is configured to allow fluid to travel from an interior of the second elongate housing to an exterior of the second elongate housing;

the primary filter section is configured to allow fluid to travel from an exterior of the first elongate housing to an interior of the first elongate housing, and the secondary filter section is configured to allow fluid to travel from an interior of the second elongate housing to an exterior of the second elongate housing the first porous section comprises a plurality of first openings;

each of the first openings comprises a dimension in the range of from about 30 µm to about 500 µm;

each of the first openings comprises a dimension in the range of from about 30 µm to about 200 µm;

each of the first openings comprises a dimension in the range of from about 30 µm to about 100 µm;

each of the first openings comprises a dimension in the range of from about 40 µm to about 60 µm;

the first porous section comprises a plurality of elongate first openings, each elongate first opening comprising a first major dimension and a first minor dimension that is less than the first major dimension;

the first major dimension is substantially parallel with respect to a longitudinal axis of the primary filter section;

the first minor dimension is substantially orthogonal with respect to a longitudinal axis of the primary filter section;

the first major dimension is substantially parallel with respect to a longitudinal axis of the primary filter section and the first minor dimension is substantially orthogonal with respect to a longitudinal axis of the primary filter section;

the first major dimension is substantially orthogonal with respect to a longitudinal axis of the primary filter section;

the first minor dimension is substantially parallel with respect to a longitudinal axis of the primary filter section;

the first major dimension is substantially orthogonal with respect to a longitudinal axis of the primary filter section and the first minor dimension is substantially parallel with respect to a longitudinal axis of the primary filter section;

the first minor dimension is in the range of from about 30 µm to about 500 µm;

the first minor dimension is in the range of from about 30 µm to about 200 µm;

the first minor dimension is in the range of from about 30 µm to about 100 µm;

the first minor dimension is in the range of from about 40 µm to about 60 µm;

the first porous section is comprised in a first wedge wire filter element;

the first wedge wire filter element comprises a plurality of first wire elements arranged to define an elongate opening between each adjacent pair of first wire elements;

each first wire element comprises a cross-section substantially in the shape of a wedge;

each first wire element comprises a cross-section substantially in the shape of a triangle;

each first wire element comprises a cross-section substantially in the shape of a trapezoid;

each first wire element comprises a cross-section substantially in the shape of a bi-laterally symmetrical trapezoid;

each first wire element comprises a cross-section substantially in the shape of a sector;

each first wire element comprises a cross-section substantially in the shape of a quadrant;

each first wire element comprises a cross-section substantially in the shape of a sextant;

each first wire element comprises a cross-section substantially in the shape of a semicircle;

each first wire element comprises a cross-section substantially in the shape of a parabolic segment;

each first wire element comprises a tapered portion oriented to have a decreasing cross-sectional dimension in a direction toward an interior of the first wedge wire filter element;

the second porous section comprises a plurality of second openings;

each of the second openings comprises a dimension in the range of from about 10 µm to about 150 µm;

each of the second openings comprises a dimension in the range of from about 10 µm to about 100 µm;

each of the second openings comprises a dimension in the range of from about 10 µm to about 50 µm;

each of the second openings comprises a dimension in the range of from about 10 µm to about 30 µm;

the second porous section comprises a plurality of elongate second openings, each elongate second opening comprising a second major dimension and a second minor dimension that is less than the major dimension;

the second major dimension is substantially parallel with respect to a longitudinal axis of the secondary filter section;

the second minor dimension is substantially orthogonal with respect to a longitudinal axis of the secondary filter section;

the second major dimension is substantially parallel with respect to a longitudinal axis of the second filter section and the second minor dimension is substantially orthogonal with respect to a longitudinal axis of the secondary filter section;

the second major dimension is substantially orthogonal with respect to a longitudinal axis of the secondary filter section;

wherein the second minor dimension is substantially parallel with respect to a longitudinal axis of the secondary filter section;

wherein the second major dimension is substantially orthogonal with respect to a longitudinal axis of the second filter section and the second minor dimension is substantially parallel with respect to a longitudinal axis of the secondary filter section;

the second minor dimension is in the range of from about 10 μm to about 150 μm;
the second minor dimension is in the range of from about 10 μm to about 100 μm;
the second minor dimension is in the range of from about 10 μm to about 50 μm;
the second minor dimension is in the range of from about 10 μm to about 30 μm;
the second porous section is comprised in a second wedge wire filter element;
the second wedge wire filter element comprises a plurality of second wire elements arranged to define an elongate opening between each adjacent pair of second wire elements;
each second wire element comprises a cross-section substantially in the shape of a wedge;
each second wire element comprises a cross-section substantially in the shape of a triangle;
each second wire element comprises a cross-section substantially in the shape of a trapezoid;
each second wire element comprises a cross-section substantially in the shape of a bi-laterally symmetrical trapezoid;
each second wire element comprises a cross-section substantially in the shape of a sector;
each second wire element comprises a cross-section substantially in the shape of a quadrant;
each second wire element comprises a cross-section substantially in the shape of a sextant;
each second wire element comprises a cross-section substantially in the shape of a semicircle;
each second wire element comprises a cross-section substantially in the shape of a parabolic segment;
each first wire element comprises a tapered portion oriented to have a decreasing dimension in a direction toward an interior of the first wedge wire filter element;
the fluid filter device further comprises a first cleaning element to remove fouling materials from the first porous section of the primary filter section;
the fluid filter device further comprises a first cleaning element to remove fouling materials from an exterior portion the first porous section of the primary filter section;
the first cleaning element is annular;
the first cleaning element comprises a mechanical scraping element;
the mechanical scraping element comprises a brush element;
the mechanical scraping element comprises a foam element;
the mechanical scraping element comprises an O-ring element;
the first cleaning element comprises a sleeve portion;
the sleeve portion comprises a chamber for receiving a cleaning fluid;
the first cleaning element is coupled to a motive element that is configured to move the first cleaning element with respect to the first porous section;
the first cleaning element is coupled to a motive element that is configured to reversibly move the first cleaning element with respect to the first porous section;
the motive element is configured to move the first cleaning element with respect to the first porous section between a parked position and a cleaning position;
in the cleaning position, the first cleaning element at least partially blocks passage of fluid through the first porous section;
in the cleaning position, the first cleaning element substantially completely blocks passage of fluid through the first porous section;
the fluid filter devices further comprises a fluid backwash valve element operable between: (i) a closed position in which fluid flow is in a direction from the first porous section to the second porous section, and (ii) an open position wherein at least a portion of fluid flow is in a direction from the second porous section to the first porous section;
the backwash valve element is configured to be moved to the open position upon being contacted by the first cleaning element;
the first cleaning element comprises a peripheral portion configured to create a substantial fluid seal with an abutting surface of the backwash valve element when the backwash valve element is in the open position;
the backwash valve element comprises a biasing element configured to maintain the backwash valve element in the closed position during normal operation of the fluid filter device;
the fluid filter devices further comprises a second cleaning element to remove fouling materials from the second porous section of the secondary filter section;
the fluid filter device further comprises a second cleaning element to remove fouling materials from an interior portion the second porous section of the secondary filter section;
the second cleaning element is annular;
the second cleaning element comprises a mechanical scraping element;
the mechanical scraping element comprises a brush element;
the mechanical scraping element comprises a foam element;
the mechanical scraping element comprises an O-ring element;
the second cleaning element comprises a sleeve portion;
the sleeve portion comprises a chamber for receiving a cleaning fluid;
the second cleaning element comprises an annular portion that includes at least one jet element for jetting fluid at a first side of the second porous section to remove fouling materials from a second side of the second porous section;
the annular portion is coupled to a motive element that is configured to move the annular portion with respect to the second porous section;
the annular portion is coupled to a second motive element that is configured to reversibly move the annular portion with respect to the second porous section;
the annular portion comprises a chamber for receiving a cleaning fluid;
the annular portion comprises a chamber for receiving a liquid cleaning fluid;
the annular portion comprises a chamber for receiving an aqueous cleaning fluid;
the chamber comprises a flow distribution channel in fluid communication a nozzle slit opening;
the chamber further comprises a transition zone interposed between the flow distribution channel and the nozzle slit opening; and
the transition zone comprising a decreasing thickness gradient in a direction from the flow distribution channel to the nozzle slit opening;

With reference to FIG. 1, there is illustrated a fluid filter system 10 comprising a housing 15 having an inlet 20 and an outlet 25. Disposed within housing 15 are a pair of identical fluid filter devices 100 which will be described in more detail hereinbelow.

In use, a fluid to be filtered such (e.g., water) is fed into inlet 20 in the direction of arrows A. Thus, the fluid passes through a coarse porous section 105 of each fluid filter device 100 during which the fluid is subjected to coarse filtration.

Next, the fluid travels within each fluid filter device 100 in the direction of hashed arrows B. As shown, fluid travels from coarse porous section 105 of each fluid filter device 100 to a fine porous section 110 of each fluid filter device 100. Since the fluid is under pressure, it emanates from the fine porous section 110 of each fluid filter device 100 in the direction of arrows C. The fluid then emanates from fluid outlet 25.

Thus, fluid that is treated by fluid filter system 10 is subjected to an initial filtering action by coarse porous section 105 of each fluid filter device 100. This serves to remove the larger particles from the fluid. As will be apparent to those of skill in the art, those larger particles (possibly together with other fouling materials) may aggregate on the exterior surface of coarse porous section 105 of each fluid filter device 100.

The fluid is then subjected to a second filtering step whereby finer particles still contained in the fluid are filtered by fine porous section 110 of each fluid filter device 100. These fine particles may aggregate (possibly together with other fouling materials) on a interior surface of fine porous 110 of each fluid filter device 100.

As will be described in more detail hereinbelow, an aspect of the present invention relates to a cleaning device for removing one or both of coarse particles (possibly together with other fouling materials) that aggregate on the exterior of coarse porous section 105 of each fluid filter device 100 and fine particles (possibly together with other fouling materials) which aggregate on the interior surface of fine porous section 110 of each fluid filter device 100.

In FIGS. 2-14, further details are provided on fluid filter device 100. It will be apparent to those of skill in the art that housing 15 has been removed for clarity purposes only.

Figure 2:
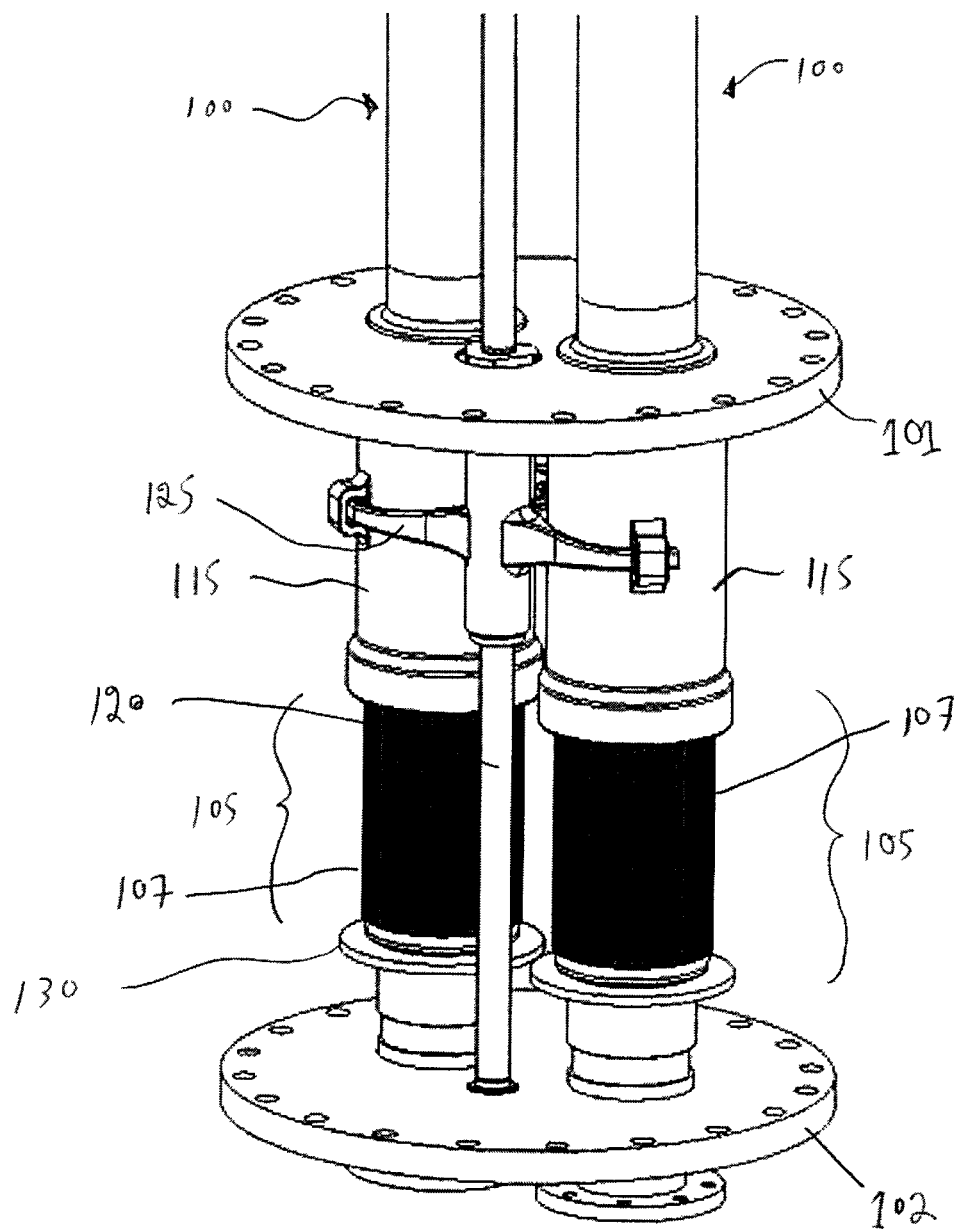
FIG. 2 illustrates a perspective view of a portion of the fluid filter device illustrated in FIG. 1 in an "in use" position.
Figure 3:
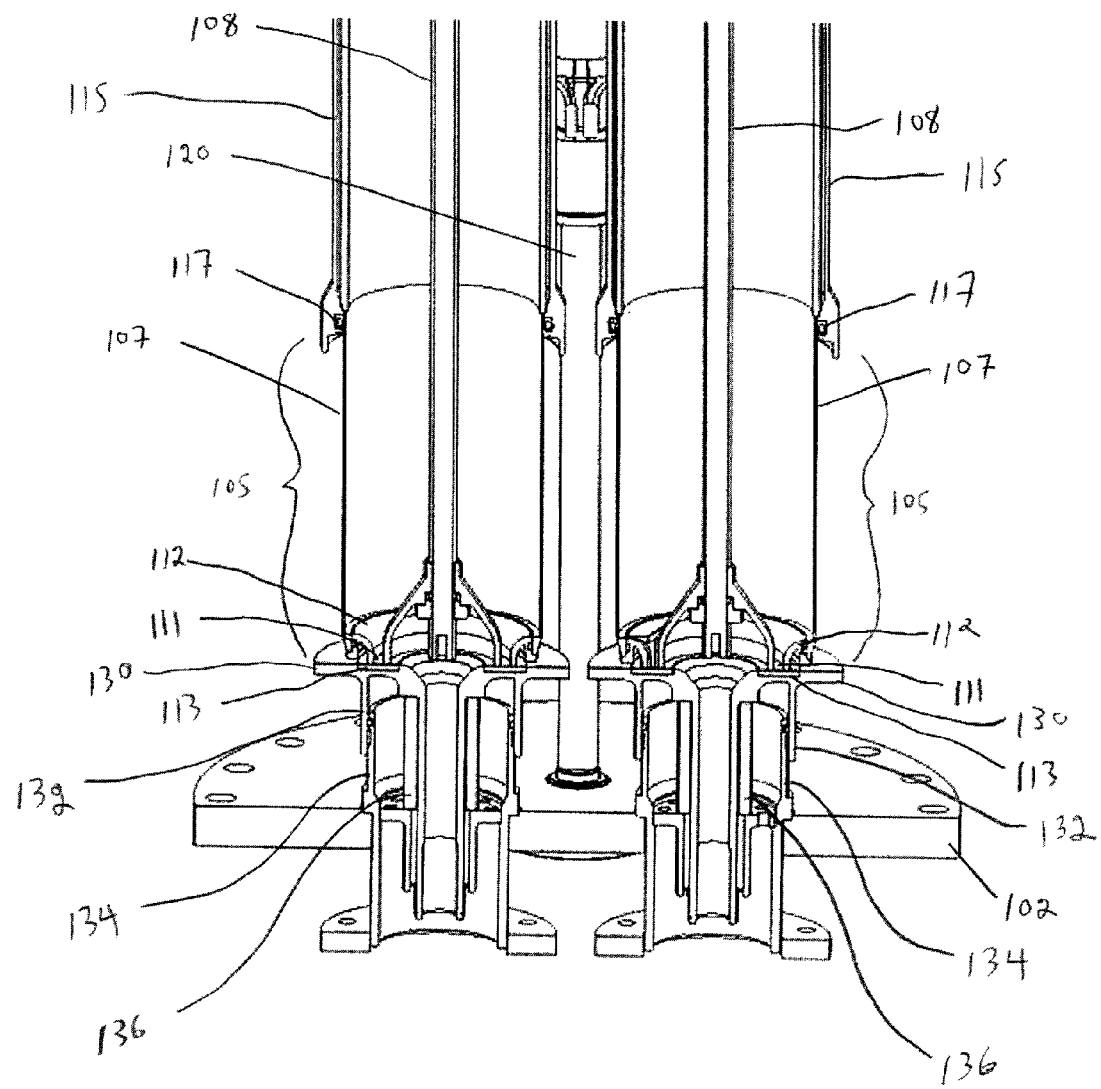
FIG. 3 illustrates a sectional view of the fluid filter device shown in FIG. 2.
Figure 4:
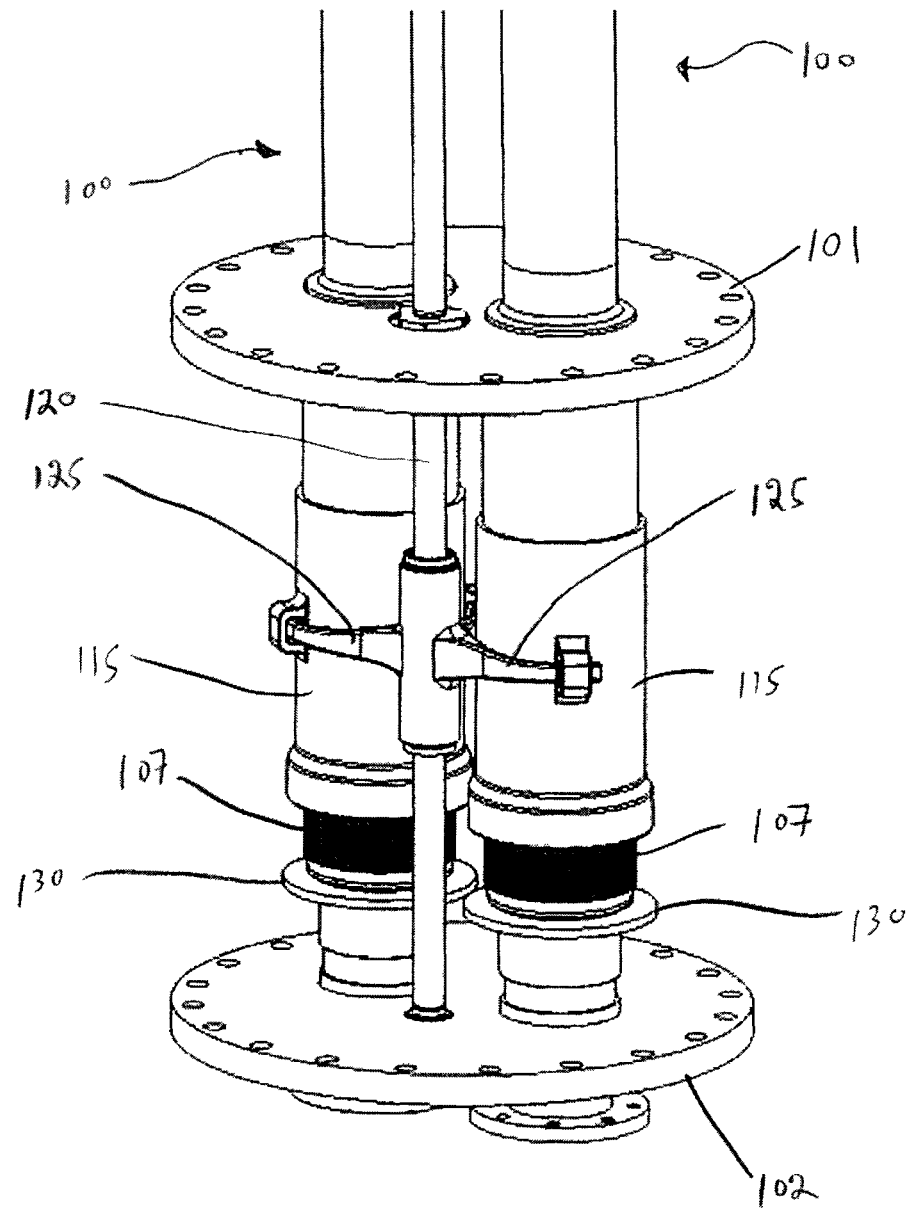
FIG. 4 illustrates a perspective view of a portion of the fluid filter device illustrated in FIG. 1 where the cleaning device is being actuated.
Figure 5:
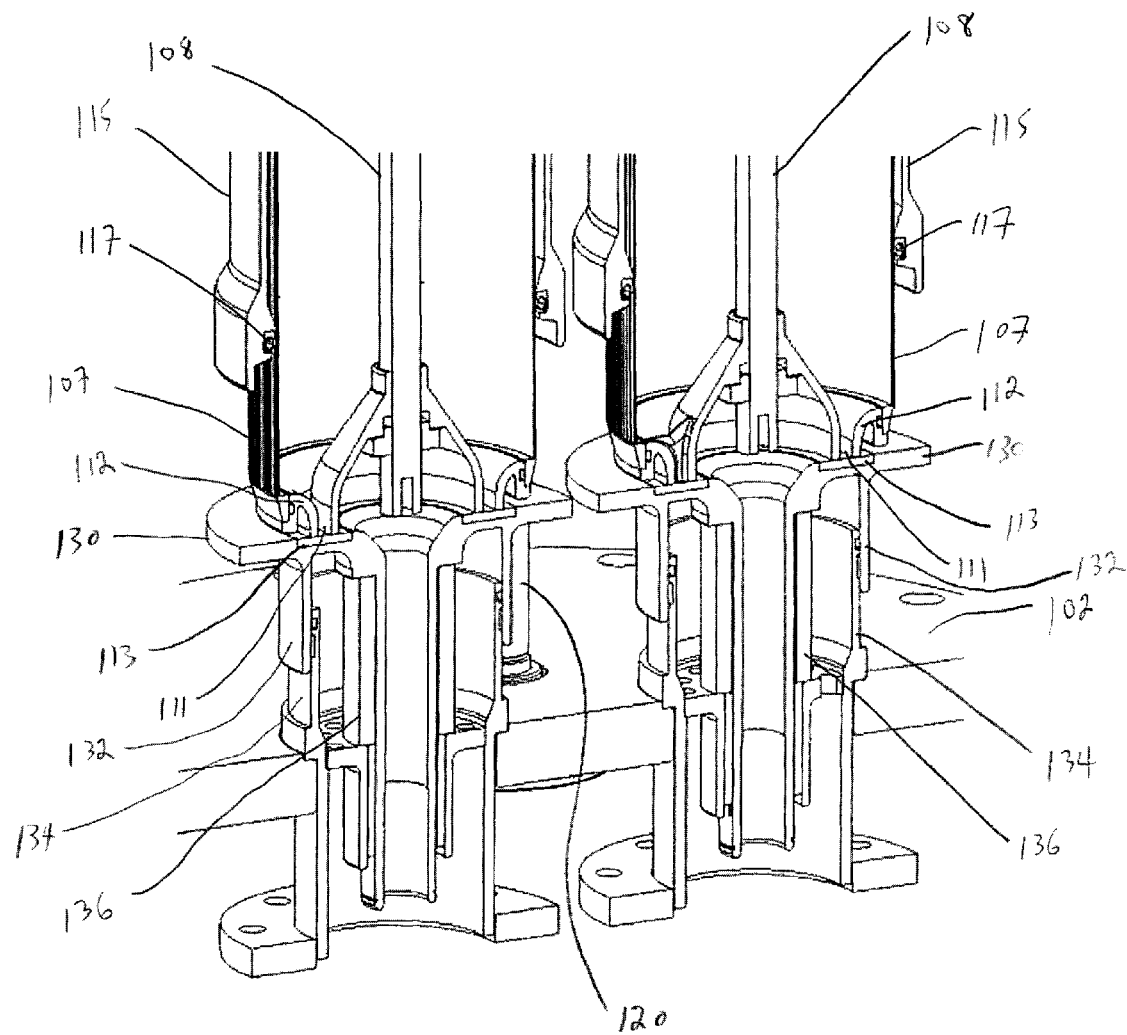
FIG. 5 illustrates a sectional view of the fluid filter device shown in FIG. 4.

Thus, with reference to FIGS. 2 and 3, there is shown the lower portion of each fluid filter device 100 in a so-called "in use" position. As shown, each fluid filter device 100 is affixed to an isolation flange 101 and a lower flanged 102.

Coarse porous section 105 of each fluid filter device 100 comprises an axial filter screen 107 that is preferably in the form of a wedge wire filter. Preferably, the axial filter screen has the specifications described above for the first porous section of the present fluid filter device.

Disposed above coarse porous section 105 of fluid filter device 100 is a cleaning sleeve 115 that is connected to a linear drive 120 by a yolk 125. Disposed below coarse porous section 105 of fluid filter device 100 is a T-valve 130. The operation of T-valve will be described herein below.

With particular reference to FIG. 3, it will be seen that the interior of coarse porous section 105 of each fluid filter device 100 comprises a tie rod 108. The lower portion of coarse porous section 105 of fluid filter device 100 comprises an annular backwash opening 111 defined by an annular end portion 112. The distal edges of annular end portion 112 are in sealing abutment with a filter seal 113 disposed on the upper surface of T-valve 130.

T-valve 130 comprises a sliding portion 132 that is movable with respect to a base portion 134. T-valve element 130 is normally maintained in the position shown in FIGS. 2 and 3 by a biasing element 136 (e.g., an elastomer spring, a metallic spring, etc.).

As shown particularly in FIG. 3, cleaning sleeve 115 comprises a scraper element 117 for removing fouling materials from the exterior surface of axial filter screen 107 of coarse porous section 105. Preferably, scraper element 117 is in the form of a polymer (e.g., elastomer) scraper.

As described above, in normal use, fluid to be filtered will pass through axial filter screen 107 of coarse porous section 105. After a period of time it is possible that particulate or other fouling materials will aggregate on the exterior surface of axial filter screen 107 of coarse porous section 105. When it is desired to remove these fouling materials, linear drive 120 is actuated to move cleaning sleeve 115 toward T-valve 130—see FIGS. 4 and 5 which show cleaning sleeve 115 being lowered toward T-valve 130.

Figure 6:
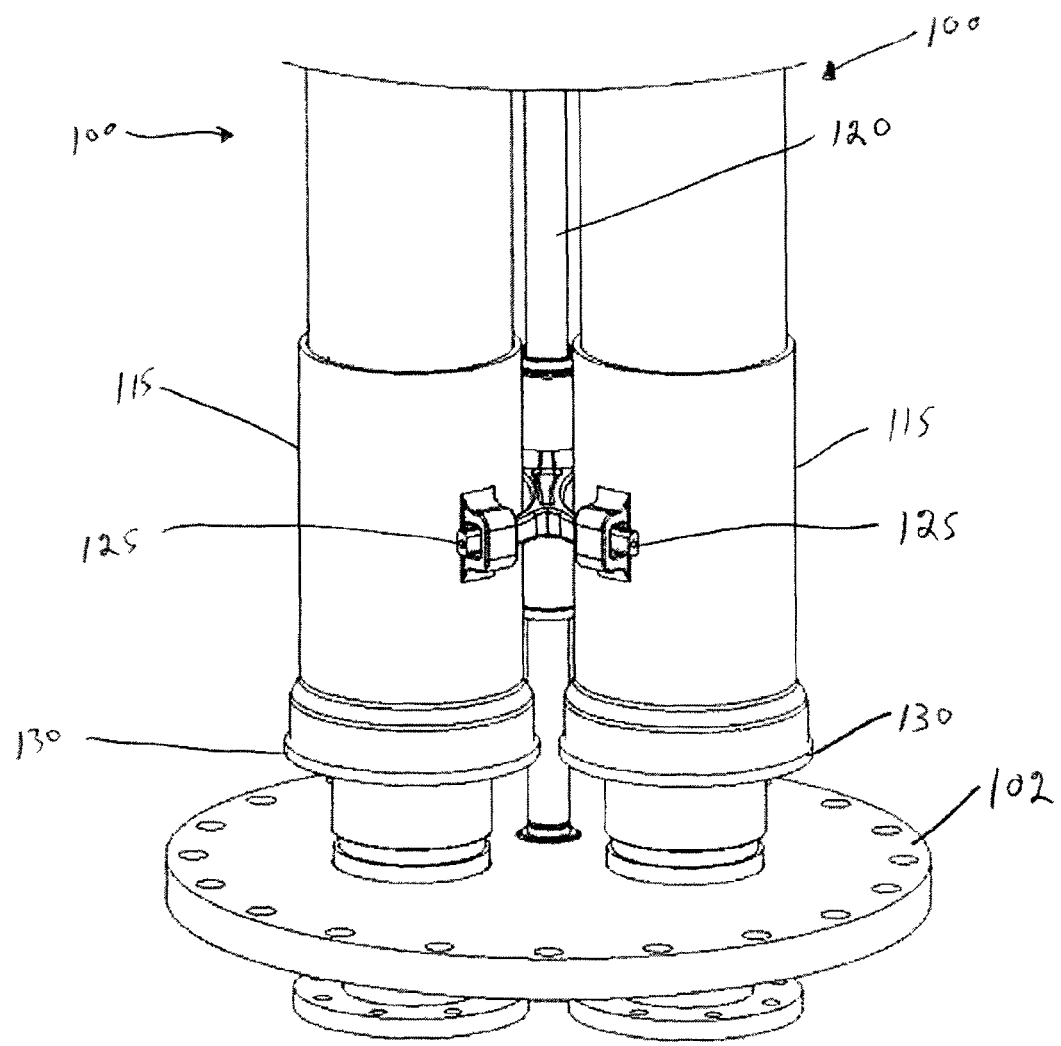
FIG. 6 illustrates a perspective view of a portion of the fluid filter device illustrated in FIG. 1 wherein the cleaning system fully covers the first porous section of the fluid filter device and the backwash system has been actuated.
Figure 7:
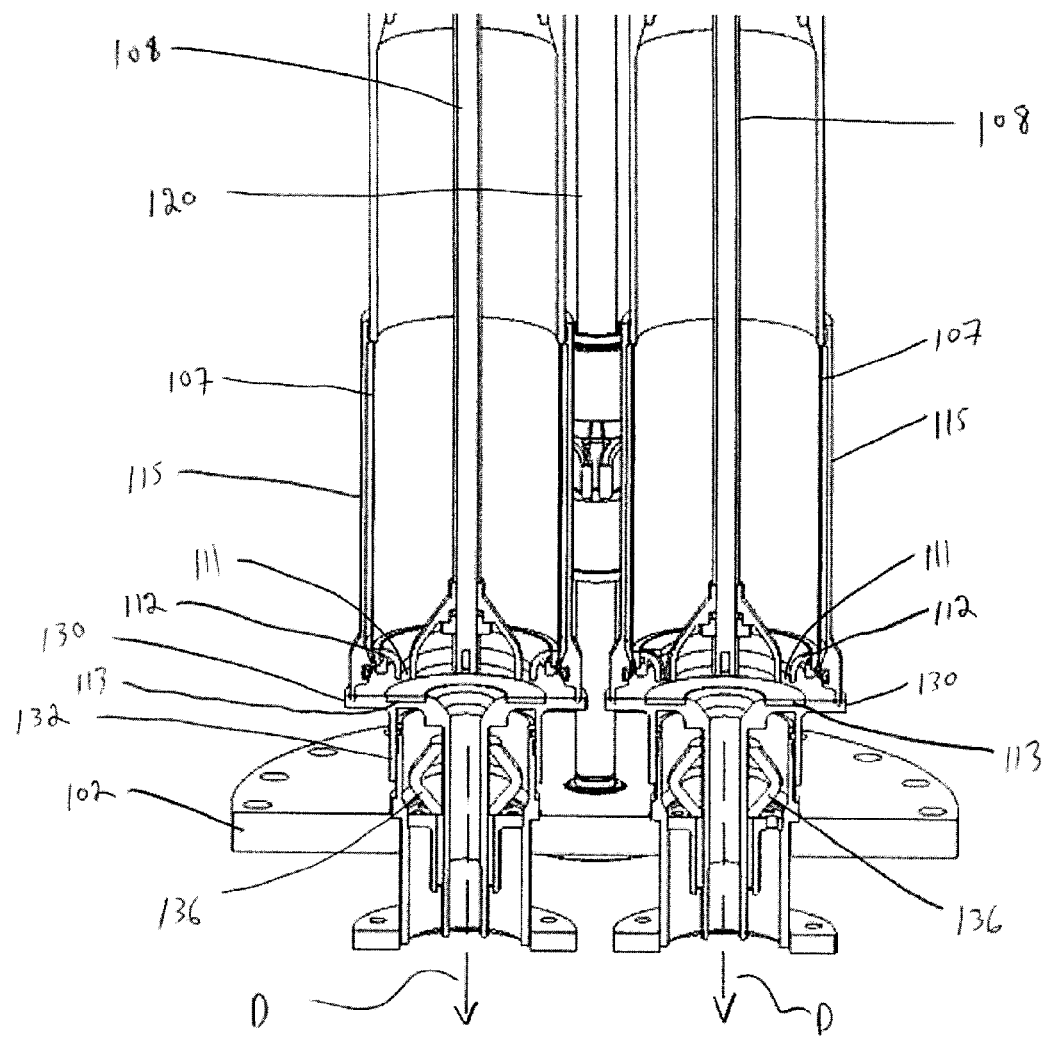
FIG. 7 illustrates a sectional view of the fluid filter device shown in FIG. 6.
Figure 8:
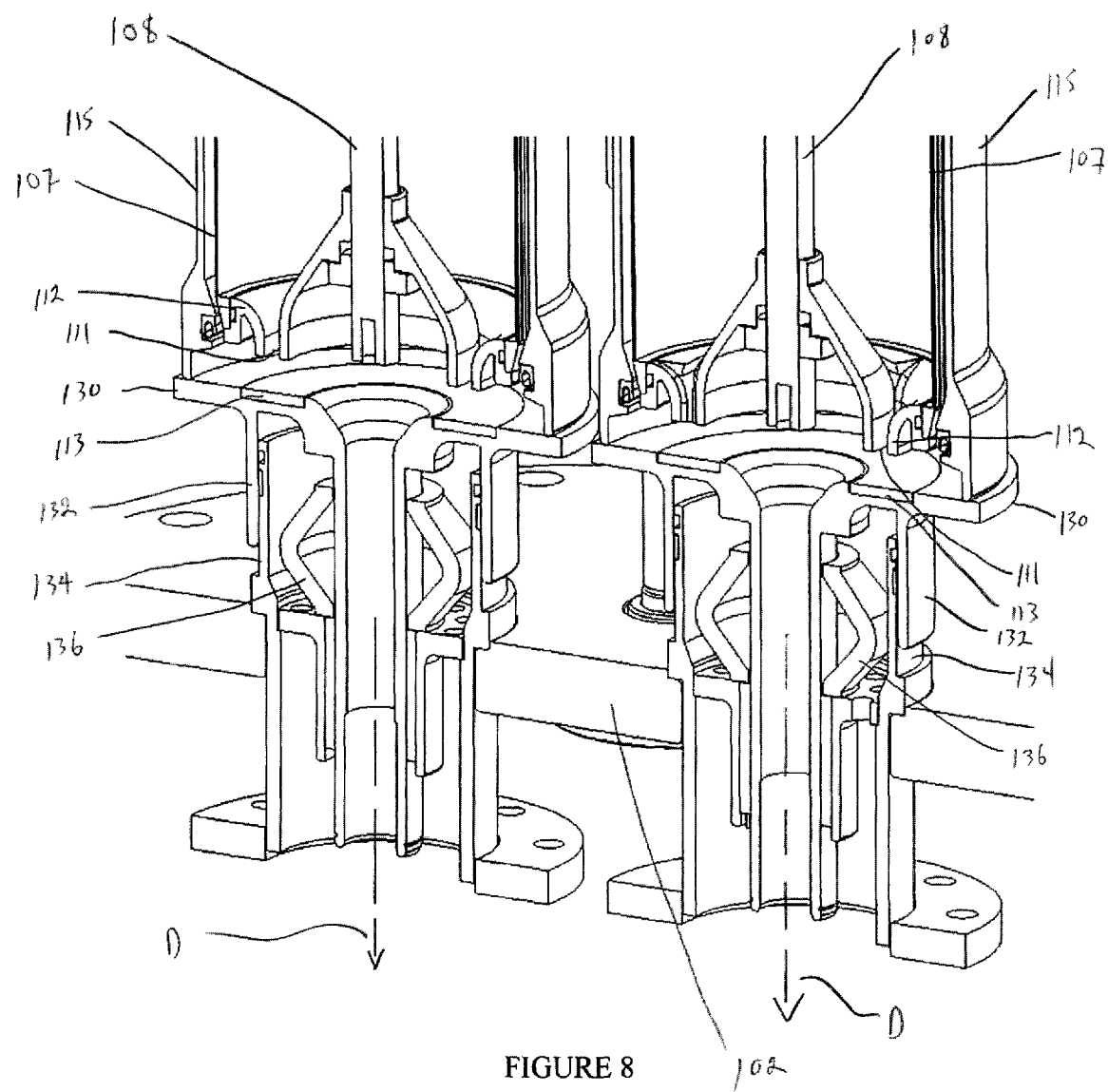
FIG. 8 illustrates an enlarged perspective sectional view of the fluid filter device shown in FIG. 7.
Figure 9:
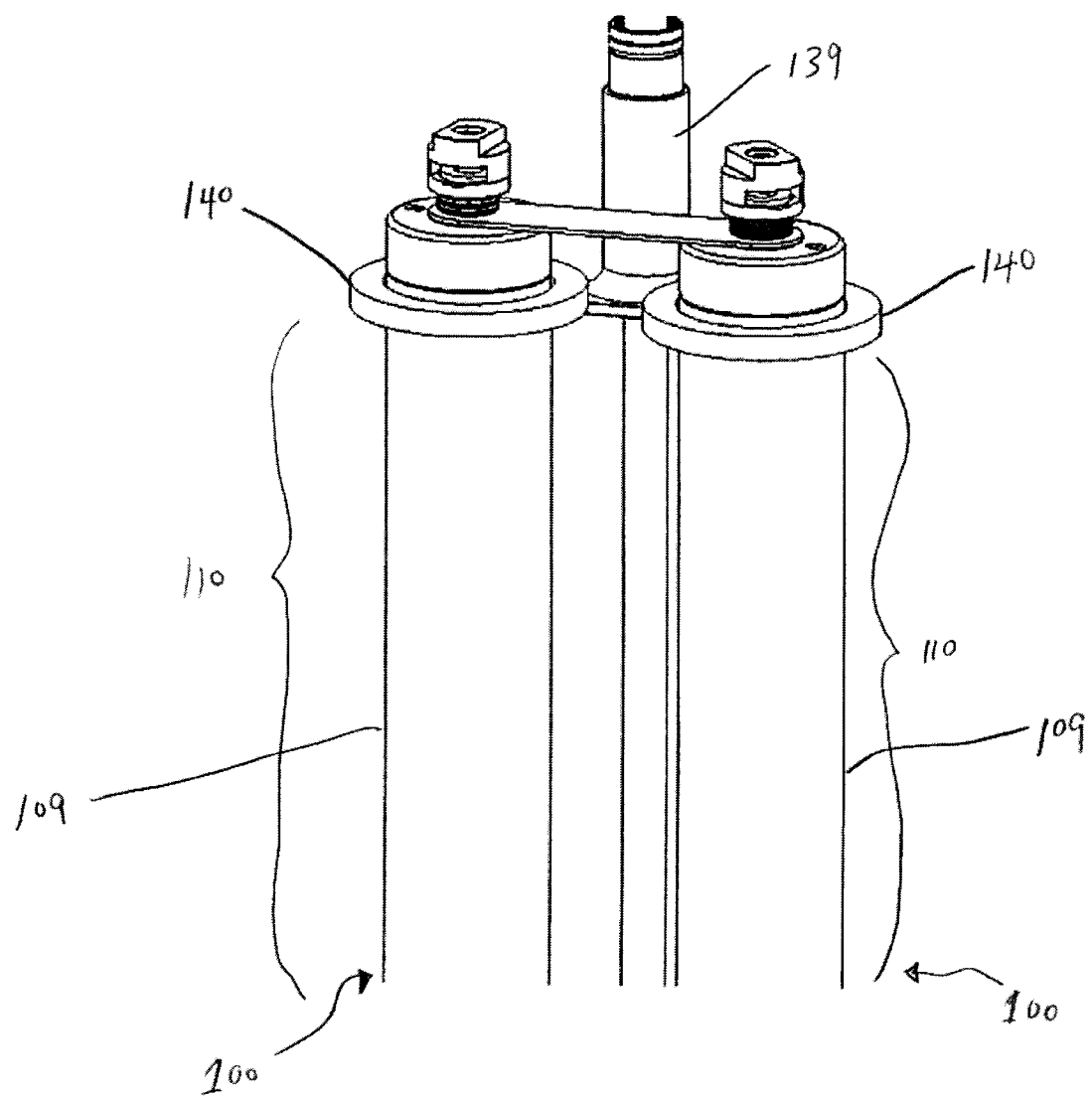
FIG. 9 illustrates a perspective view of the top portion of the fluid filter device shown in FIG. 2 with a cleaning system in a so-called "parked" position.
Figure 10:
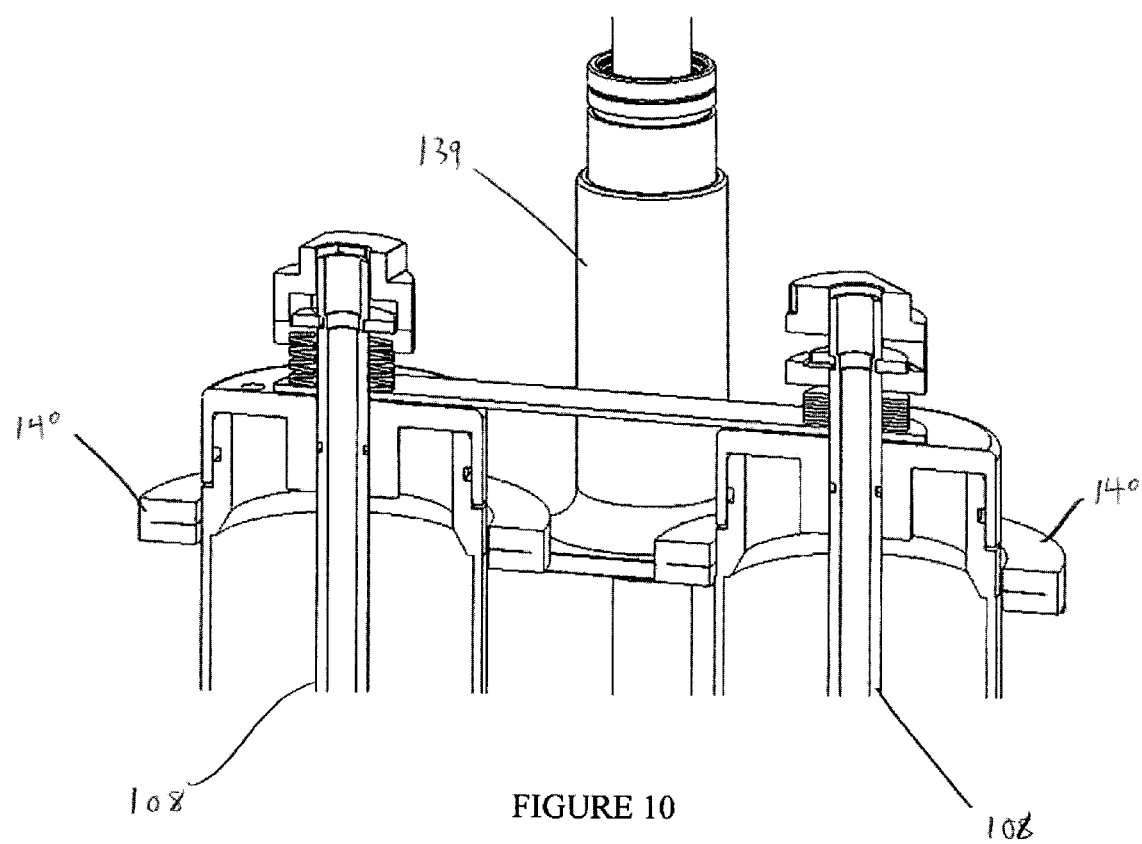
FIG. 10 illustrates an enlarged sectional view of the portion of the fluid filter device shown in FIG. 9.
Figure 11:
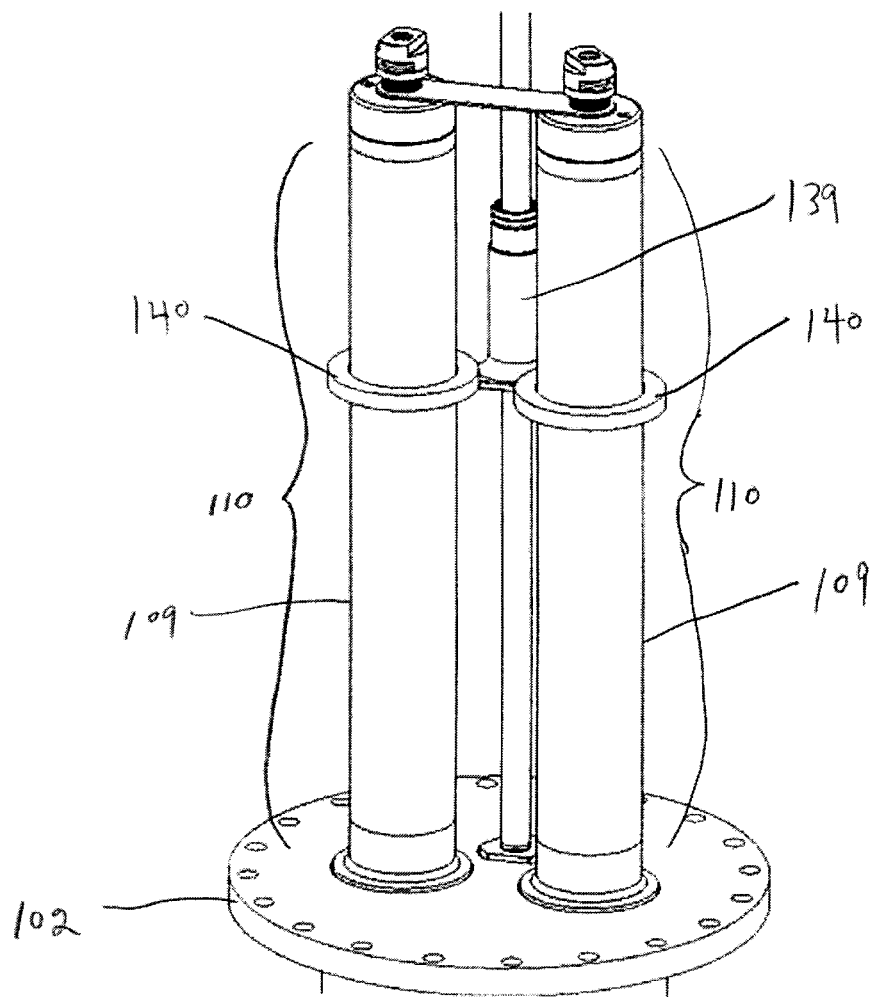
FIG. 11 illustrates a perspective view of the top portion of the fluid filter device shown in FIG. 9 with the cleaning system being actuated.

FIGS. 6-8 illustrate fluid filter devices 100 wherein cleaning sleeves 115 of each fluid filter device 100 fully covers coarse porous section 105 while concurrently actuating T-valve to allow backwashing of fluid from the interior of fluid filter device 100.

Thus, as shown with particular reference to FIGS. 7 and 8, the distal most edge of cleaning sleeve 115 contacts the upper surface of T-valve 130 thereby pushing downward sliding portion 132 and compressing biasing element 136. The combination of these actions serves to separate annular end portion 112 of cleaning sleeve 115 from filter seal 113 of T-valve 130. This serves to allow fluid contained in fluid filter device 100 to pass through annular backwash opening 111 and out of T-valve 130 in the direction of arrow D.

After the backwashing step has been completed, linear drive 120 is reversed and cleaning sleeve 115 is retracted away from T-valve 130. Biasing element 136 then moves sliding portion 132 upward such that annular end portion 112 of cleaning sleeve 115 is returned to a sealing engagement position with filter seal 113 of T-valve 130. This also exposes axial filter screen 107 of coarse porous section 105 to allow fluid to be filtered.

With reference to FIGS. 9-12, there is illustrated a portion of the porous section 110 of fluid filter device 100.

Fine coarse section 110 comprises an axial filter screen 109. Preferably, axial filter screen 109 has these specifications described above for the second porous section of the present fluid filter device.

An annular cleaning ring 140 is disposed on the outside of axial filter screen 109. Cleaning ring 140 is attached to a drive yolk 139 which serves to move cleaning ring 140 along the exterior of axial filter screen 109—see, for example, FIG. 11 which illustrates cleaning rings 140 being moved along the exterior surface of axial filter screen 109.

Figure 12:
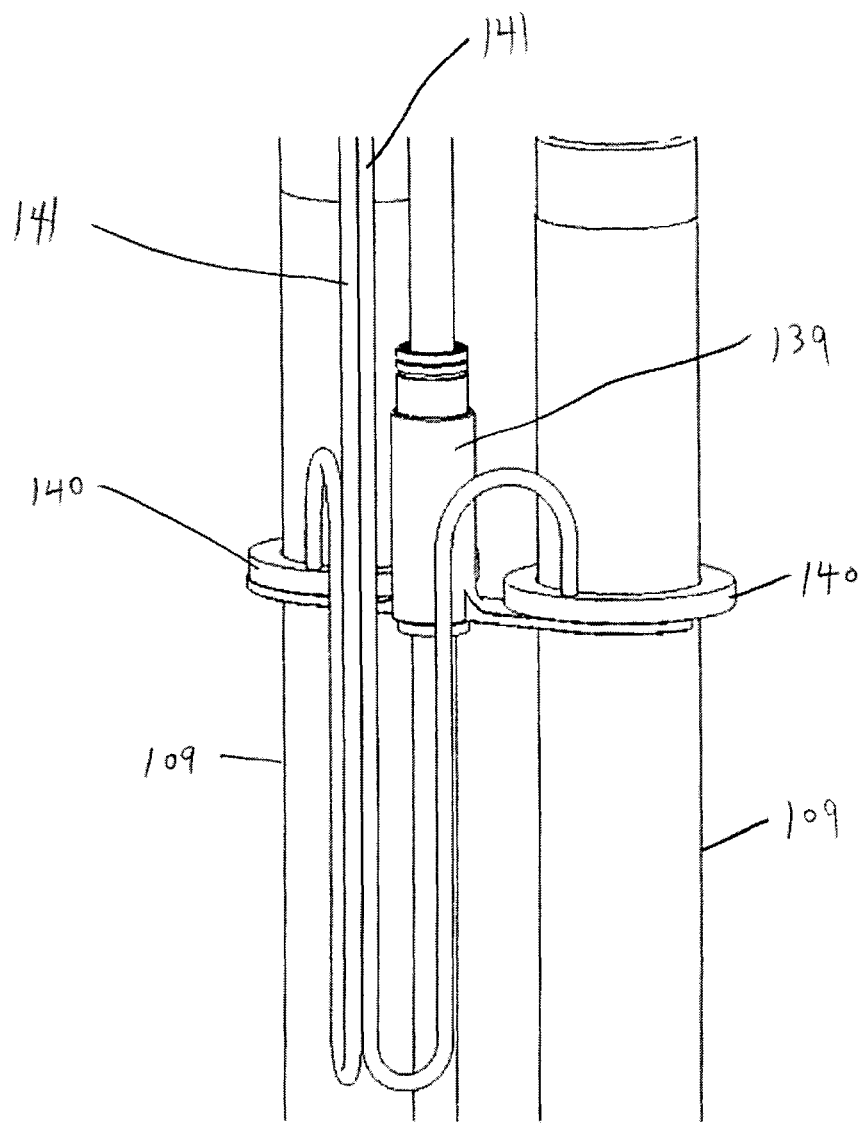
FIG. 12 illustrates a rear portion of the fluid filter device illustrated in FIGS. 9-11.

With particular reference to FIG. 12, it can been seen that a line 141 is connected to each annular cleaning ring 140. Line 141 supplies pressurized fluid (liquid or gas) to annular cleaning rings 140.

Figure 13:
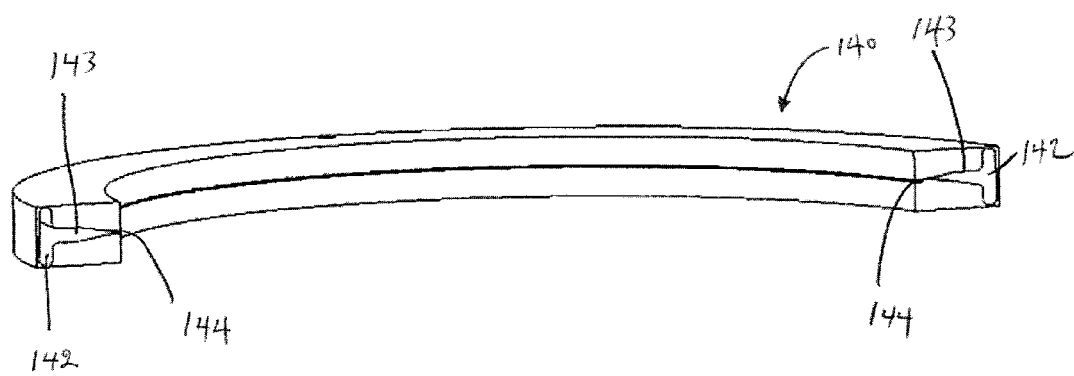
FIG. 13 illustrates a cross-sectional view of the cleaning ring used in the fluid filter device illustrated in FIGS. 9-12.
Figure 14:
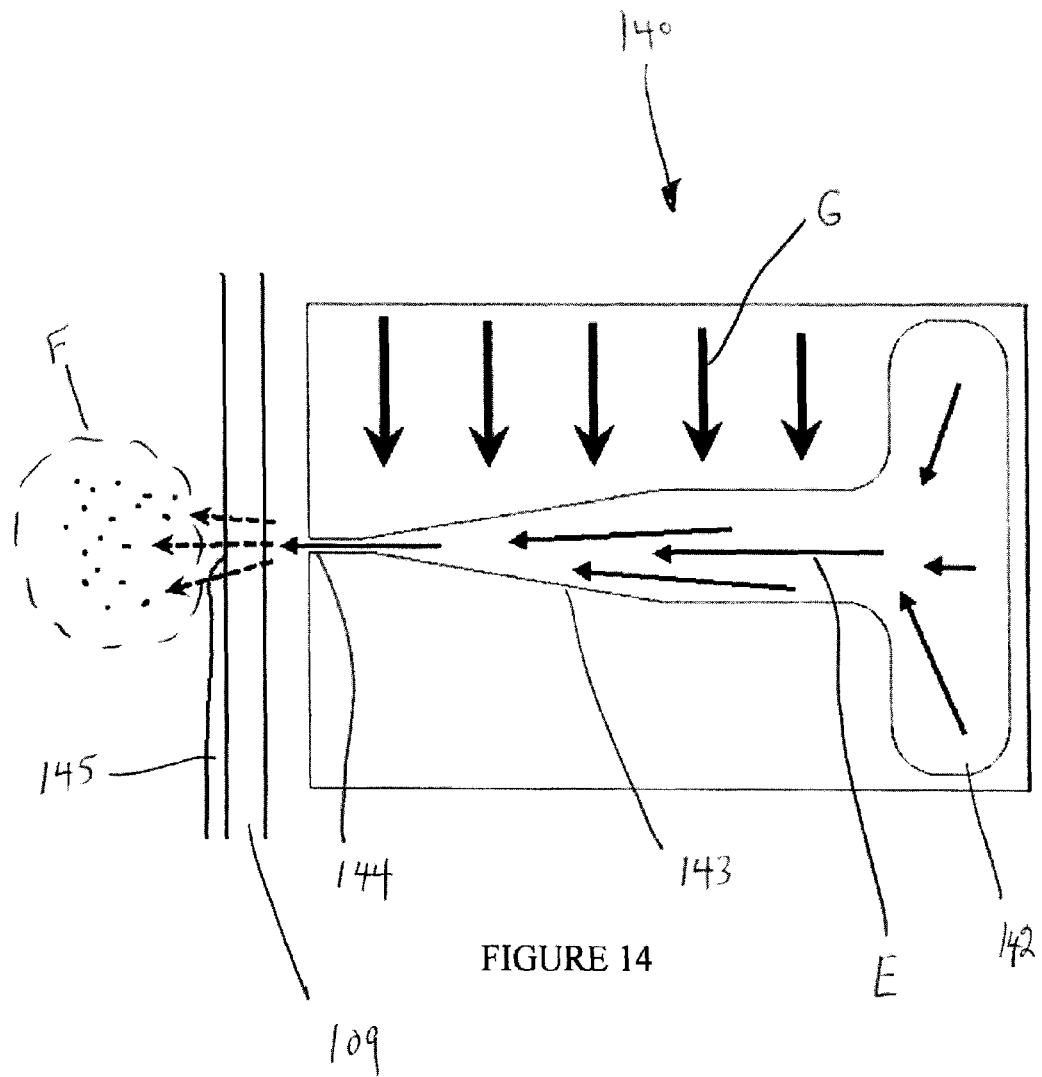
FIG. 14 illustrates a schematic view of operation of the cleaning ring used in the fluid filter device illustrated in FIGS. 9-13.

With particular reference to FIGS. 13 and 14, it can been seen that annular cleaning ring 140 operates in a manner similar to a so-called "water knife". Thus, annular cleaning ring 140 comprises an interior chamber having a fluid distribution channel 142, a fluid flow transition 143 and a slit 144.

With particular reference to FIG. 14, and as discussed above with reference to FIG. 1, it is common to have particulate and other fouling materials 145 aggregate on the interior surface of axial filter screen 109. Fouling materials 145 may be removed in the following manner.

A source of pressurized fluid (liquid or gas), preferably water, is fed through line 141 into flow distribution channel 142 of annular cleaning ring 140. The pressurized fluid moves in the direction of arrow E and exits slit 144 as shown to impinge on axial filter screen 109 at a relatively high pressure. This high pressure fluid blasts fouling material 145 as shown in circle F. As drive yolk 139 is actuated to move annular cleaning ring 140 in the direction of arrow G, fouling materials 145 are continuously removed from the interior surface of axial filter screen 109.

In a preferred embodiment cleaning rings 140 are actuated at the same time as cleaning sleeves 115 with the result that backwash of fluid from the interior of fluid filter device 100 removes fouling materials 145 that have been dislodged from the interior surface of axial filter screen 109 by operation of cleaning rings 140. Alternatively, it is possible to actuate cleaning rings 140 when fluid filter device 100 is not in use—e.g., as part of a periodic maintenance procedure.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, while the illustrated axial filter screen for use in the present fluid filter device is a so-called wedge wire filter it is possible to use other filters for the axial filter screen—e.g., mesh, screens, sintered elements (e.g., made from brass, stainless steel and the like) and the like. Further, while the illustrated annular cleaning ring 140 comprises a continuous single, annular slit 144, it is possible to utilize a multiplicity of individual jets or nozzles. Still further, while the illustrated embodiment comprises a single line 141 connected to a single annular cleaning ring 140, it is possible to have one line 141 connected to a multiplicity of annular cleaning rings 140 (e.g., serial connection). It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid filter device comprising:
a primary filter section having a first porous section;
a secondary filter section having a second porous section;
a first cleaning element to remove fouling materials from the first porous section of the primary filter section; and
a fluid backwash valve element operable between: (i) a closed position in which fluid flow is in a direction from the first porous section to the second porous section, and (ii) an open position wherein at least a portion of fluid flow is in a direction from the second porous section to the first porous section,
wherein: (i) the primary filter section and the secondary filter section are in fluid communication with one another, and (ii) the first porous section has a greater porosity than the second porous section, and
wherein the backwash valve element is configured to be moved to the open position upon being contacted by the first cleaning element.

2. The fluid filter device defined in claim 1, wherein the primary filter section is comprised in a first elongate housing and the secondary filter section is comprised in a second elongate housing.

3. The fluid filter device defined in claim 2, wherein the primary filter section is configured to allow fluid to travel from an exterior of the first elongate housing to an interior of the first elongate housing, and the secondary filter section is configured to allow fluid to travel from an interior of the second elongate housing to an exterior of the second elongate housing.

4. The fluid filter device defined in claim 1, wherein the primary filter section is configured to allow fluid to travel from an exterior thereof to an interior thereof, and the secondary filter section is configured to allow fluid to travel from an interior thereof to an exterior thereof.

5. The fluid filter device defined in claim 1, wherein the first porous section comprises a plurality of first openings.

6. The fluid filter device defined in claim 5, wherein each of the first openings comprises a dimension in the range of from about 30 µm to about 500 µm.

7. The fluid filter device defined in claim 5, wherein the first porous section is comprised in a first wedge wire filter element.

8. The fluid filter device defined in claim 7, wherein the first wedge wire filter element comprises a plurality of first wire elements arranged to define an elongate opening between each adjacent pair of first wire elements.

9. The fluid filter device defined in claim 8, wherein each first wire element comprises a tapered portion oriented to have a decreasing cross-sectional dimension in a direction toward an interior of the first wedge wire filter element.

10. The fluid filter device defined in claim 1, wherein the first porous section comprises a plurality of elongate first openings, each elongate first opening comprising a first major dimension and a first minor dimension that is less than the first major dimension.

11. The fluid filter device defined in claim 10, wherein the first minor dimension is in the range of from about 30 µm to about 500 µm.

12. The fluid filter device defined in claim 1, wherein the second porous section comprises a plurality of second openings.

13. The fluid filter device defined in claim 12, wherein each of the second openings comprises a dimension in the range of from about 10 µm to about 150 µm.

14. The fluid filter device defined in claim 12, wherein the second porous section is comprised in a second wedge wire filter element.

15. The fluid filter device defined in claim 14, wherein the second wedge wire filter element comprises a plurality of second wire elements arranged to define an elongate opening between each adjacent pair of second wire elements.

16. The fluid filter device defined in claim 15, wherein each second wire element comprises a tapered portion oriented to have an increasing cross-sectional dimension in a direction toward an interior of the second wedge wire filter element.

17. The fluid filter device defined in claim 1, wherein the second porous section comprises a plurality of elongate second openings, each elongate second opening comprising a second major dimension and a second minor dimension that is less than the major dimension.

18. The fluid filter device defined in claim 17, wherein the second minor dimension is in the range of from about 10 µm to about 150 µm.

19. The fluid filter device defined in claim 1, wherein the backwash valve element comprises a biasing element configured to maintain the backwash valve element in the closed position during normal operation of the fluid filter device.

20. A fluid filter device comprising:
a primary filter section having a first porous section;
a secondary filter section having a second porous section;
a first cleaning element to remove fouling materials from the first porous section of the primary filter section; and
a fluid backwash valve element operable between: (i) a closed position in which fluid flow is in a direction from the first porous section to the second porous section, and (ii) an open position wherein at least a portion of fluid flow is in a direction from the second porous section to the first porous section,
wherein: (i) the primary filter section and the secondary filter section are in fluid communication with one another, and (ii) the first porous section has a greater porosity than the second porous section,
wherein the backwash valve element is configured to be moved to the open position upon being contacted by the first cleaning element, and
wherein the first cleaning element comprises a peripheral portion configured to create a substantial fluid seal with an abutting surface of the backwash valve element when the backwash valve element is in the open position.

21. The fluid filter device defined in claim 20, wherein the backwash valve element comprises a biasing element configured to maintain the backwash valve element in the closed position during normal operation of the fluid filter device.

22. The fluid filter device defined in claim 20, wherein the primary filter section is comprised in a first elongate housing and the secondary filter section is comprised in a second elongate housing.

23. The fluid filter device defined in claim 22, wherein the primary filter section is configured to allow fluid to travel from an exterior of the first elongate housing to an interior of the first elongate housing, and the secondary filter section is configured to allow fluid to travel from an interior of the second elongate housing to an exterior of the second elongate housing.

24. The fluid filter device defined in claim 20, wherein the primary filter section is configured to allow fluid to travel from an exterior thereof to an interior thereof, and the secondary filter section is configured to allow fluid to travel from an interior thereof to an exterior thereof.

25. The fluid filter device defined in claim 20, wherein the first porous section comprises a plurality of first openings.

26. The fluid filter device defined in claim 25, wherein each of the first openings comprises a dimension in the range of from about 30 μm to about 500 μm.

27. The fluid filter device defined in claim 25, wherein the first porous section is comprised in a first wedge wire filter element.

28. The fluid filter device defined in claim 27, wherein the first wedge wire filter element comprises a plurality of first wire elements arranged to define an elongate opening between each adjacent pair of first wire elements.

29. The fluid filter device defined in claim 28, wherein each first wire element comprises a tapered portion oriented to have a decreasing cross-sectional dimension in a direction toward an interior of the first wedge wire filter element.

30. The fluid filter device defined in claim 20, wherein the first porous section comprises a plurality of elongate first openings, each elongate first opening comprising a first major dimension and a first minor dimension that is less than the first major dimension.

31. The fluid filter device defined in claim 30, wherein the first minor dimension is in the range of from about 30 μm to about 500 μm.

32. The fluid filter device defined in claim 20, wherein the second porous section comprises a plurality of second openings.

33. The fluid filter device defined in claim 32, wherein each of the second openings comprises a dimension in the range of from about 10 μm to about 150μm.

34. The fluid filter device defined in claim 32, wherein the second porous section is comprised in a second wedge wire filter element.

35. The fluid filter device defined in claim 34, wherein the second wedge wire filter element comprises a plurality of second wire elements arranged to define an elongate opening between each adjacent pair of second wire elements.

36. The fluid filter device defined in claim 35, wherein each second wire element comprises a tapered portion oriented to have an increasing cross-sectional dimension in a direction toward an interior of the second wedge wire filter element.

37. The fluid filter device defined in claim 20, wherein the second porous section comprises a plurality of elongate second openings, each elongate second opening comprising a second major dimension and a second minor dimension that is less than the major dimension.

38. The fluid filter device defined in claim 37, wherein the second minor dimension is in the range of from about 10 μm to about 150 μm.

* * * * *